US011425180B2

(12) United States Patent
Liang

(10) Patent No.: US 11,425,180 B2
(45) Date of Patent: Aug. 23, 2022

(54) METHOD FOR SERVER SELECTION BASED ON LIVE STREAMING ACCOUNT TYPE

(71) Applicant: BEIJING DAJIA INTERNET INFORMATION TECHNOLOGY CO., LTD., Beijing (CN)

(72) Inventor: Xuhua Liang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/370,776

(22) Filed: Jul. 8, 2021

(65) Prior Publication Data

US 2022/0014576 A1 Jan. 13, 2022

(30) Foreign Application Priority Data

Jul. 9, 2020 (CN) .......................... 202010658687.3

(51) Int. Cl.
| | | |
|---|---|---|
| *H04L 65/612* | (2022.01) | |
| *H04L 65/611* | (2022.01) | |
| *H04L 67/1012* | (2022.01) | |
| *H04L 67/1023* | (2022.01) | |
| *H04L 67/306* | (2022.01) | |

(Continued)

(52) U.S. Cl.
CPC ...... *H04L 65/4084* (2013.01); *H04L 65/4076* (2013.01); *H04L 67/1012* (2013.01); *H04L 67/1023* (2013.01); *H04L 67/306* (2013.01); *H04N 21/2187* (2013.01); *H04N 21/2408* (2013.01)

(58) Field of Classification Search
None
See application file for complete search history.

(56) References Cited

U.S. PATENT DOCUMENTS

2006/0120385 A1* 6/2006 Atchison ................. H04L 67/06
348/E7.071
2013/0227596 A1* 8/2013 Pettis ............... H04N 21/25891
725/13

(Continued)

FOREIGN PATENT DOCUMENTS

CN 102045241 A 5/2011
CN 109348257 A 2/2019
(Continued)

OTHER PUBLICATIONS

The State Intellectual Property Office of People's Republic of China, First Office Action in Patent Application No. CN202010658687.3 dated Sep. 1, 2021, which is a foreign counterpart application corresponding to this U.S. Patent Application, to which this application claims priority.

*Primary Examiner* — Backhean Tiv
(74) *Attorney, Agent, or Firm* — Kolitch Romano LLP

(57) ABSTRACT

A method for determining a media server and a sever are provided. In the method, a live streaming access request from a target account is received; an audience number type of an anchor account in the live streaming room is determined; a target media server matching the audience number type is determined; and a live video stream in the live streaming room is transmitted, based on the target media server, to a terminal from which the target account is logged in.

20 Claims, 4 Drawing Sheets

(51) Int. Cl.
*H04N 21/2187* (2011.01)
*H04N 21/24* (2011.01)

(56) References Cited

U.S. PATENT DOCUMENTS

| | | | |
|---|---|---|---|
| 2016/0088050 A1* | 3/2016 | Einarsson | H04L 65/602 |
| | | | 709/231 |
| 2016/0277802 A1* | 9/2016 | Bernstein | H04N 21/41407 |
| 2016/0294894 A1* | 10/2016 | Miller | G06Q 30/0242 |
| 2017/0068759 A1 | 3/2017 | Ohnishi et al. | |
| 2017/0279881 A1* | 9/2017 | Chang | H04L 65/4084 |
| 2018/0124141 A1* | 5/2018 | Lewis | H04L 65/60 |
| 2018/0144396 A1* | 5/2018 | Yin | G06Q 50/01 |
| 2018/0150465 A1* | 5/2018 | Brownhill | H04L 51/32 |
| 2018/0192086 A1* | 7/2018 | Henaire | H04N 21/23424 |
| 2018/0225725 A1* | 8/2018 | Paul | G06Q 50/01 |
| 2019/0149852 A1* | 5/2019 | Zhong | H04N 21/4788 |
| | | | 725/109 |
| 2019/0200051 A1* | 6/2019 | Paul | H04N 21/41407 |
| 2019/0379916 A1* | 12/2019 | Lan | H04N 21/222 |
| 2020/0075000 A1* | 3/2020 | Merhej | G10L 15/22 |
| 2020/0260125 A1* | 8/2020 | Xiong | H04L 67/101 |
| 2021/0021663 A1* | 1/2021 | Zhou | H04N 21/4758 |
| 2021/0176300 A1* | 6/2021 | Balasubramanian | H04L 67/101 |
| 2021/0314639 A1* | 10/2021 | Li | H04N 21/26603 |
| 2022/0014576 A1* | 1/2022 | Liang | H04L 65/4076 |
| 2022/0021939 A1* | 1/2022 | Mizuta | H04N 21/4223 |

FOREIGN PATENT DOCUMENTS

| | | |
|---|---|---|
| CN | 110225361 A | 9/2019 |
| CN | 110311967 A | 10/2019 |
| CN | 111131841 A | 5/2020 |

\* cited by examiner

US 11,425,180 B2

METHOD FOR SERVER SELECTION BASED ON LIVE STREAMING ACCOUNT TYPE

CROSS-REFERENCE TO RELATED APPLICATION

This application claims priority to Chinese Patent Application No. 202010658687.3, filed on Jul. 9, 2020, which is herein incorporated by reference in its entirety.

TECHNICAL FIELD

The present disclosure relates to the technical field of communications, and in particular, relates to a method for determining a media server, and a server.

BACKGROUND

With the continuous development of Internet technologies, the live streaming industry has gradually emerged. Users watch live streaming content of an anchor in a live streaming room, and a user account that initiates the live streaming in the room is called an anchor account. When watching the live streaming, a user needs to pull the content in the live streaming room by a media server and interact with the anchor by the media server. Therefore, for each user account in the live streaming room, a live streaming platform server needs to determine a media server that serves the user account.

SUMMARY

Embodiments of the present disclosure provide a method for determining a media server, and a server.

According to one aspect of the embodiments of the present disclosure, a method for determining a media server is provided. The method includes: receiving a live streaming access request from a target account, the live streaming access request being initiated for accessing a live streaming room; determining an audience number type of an anchor account in the live streaming room, the audience number type indicating a number of online audiences in the live streaming room; determining a target media server matching the audience number type; and transmitting, based on the target media server, a live video stream in the live streaming room to a terminal from which the target account is logged in.

In some embodiments, determining the audience number type of the anchor account in the live streaming room includes: determining, in response to the anchor account belonging to either a first account list or a second account list, the audience number type of the anchor account as an audience number type corresponding to the list to which the anchor account belongs, wherein the first account list stores a plurality of accounts corresponding to a first audience number type, and the first audience number type indicates that the number of online audiences in the live streaming room is greater than a first threshold; the second account list stores a plurality of accounts corresponding to a second audience number type, and the second audience number type indicates that the number of online audiences in the live streaming room is greater than a second threshold and is less than or equal to the first threshold.

In some embodiments, determining the audience number type of the anchor account in the live streaming room includes: determining the audience number type of the anchor account as a third audience number type in response to the anchor account belonging to neither the first account list nor the second account list, the third audience number type indicating that the number of online audiences in the live streaming room is less than or equal to the second threshold.

In some embodiments, determining the target media server matching the audience number type includes: selecting one media server from a plurality of media servers as the target media server in response to the audience number type of the anchor account being the first audience number type.

In some embodiments, selecting one media server from the plurality of media servers as the target media server in response to the audience number type of the anchor account being the first audience number type includes: randomly selecting one media server from the plurality of media servers as the target media server in response to the audience number type of the anchor account being the first audience number type.

In some embodiments, determining the target media server matching the audience number type includes: selecting a target number of media servers from a plurality of media servers based on the anchor account and a total number of the plurality of media servers and selecting one media server from the target number of media servers as the target media server, in response to the audience number type of the anchor account being the second audience number type.

In some embodiments, selecting the target number of media servers from the plurality of media servers and selecting one media server from the target number of media servers as the target media server include: acquiring last target digits of the anchor account in response to the audience number type of the anchor account being the second audience number type; acquiring a remainder corresponding to the anchor account by dividing the last target digits of the anchor account by the total number of the plurality of media servers; selecting, from the plurality of media servers, a media server with a serial number being the remainder; acquiring the target number of media servers by using the serial number of the media server as a starting serial number; and selecting one media server from the target number of media servers as the target media server.

In some embodiments, determining the target media server matching the audience number type includes: selecting, in response to the audience number type of the anchor account being the third audience number type, one media server from a plurality of media servers as the target media server based on the anchor account and a total number of the plurality of media servers.

In some embodiments, selecting one media server from the plurality of media servers as the target media server includes: acquiring last target digits of the anchor account in response to the audience number type of the anchor account being the third audience number type; acquiring a remainder corresponding to the anchor account by dividing the last target digits of the anchor account by the total number of the plurality of media servers; and selecting, from the plurality of media servers, a media server with a serial number being the remainder as the target media server.

In some embodiments, in response to receiving the live streaming access request from the target account, the method further includes: detecting numbers of online audiences of a plurality of live streaming rooms at target intervals; and updating a corresponding list in the first account list and the second account list based on the numbers of online audiences of the plurality of live streaming rooms.

In some embodiments, updating the corresponding list in the first account list and the second account list includes: adding, in response to a number of online audiences of any live streaming room in the plurality of live streaming rooms being greater than the first threshold, an anchor account in the live streaming room to the first account list; and adding, in response to a number of online audiences of any live streaming room in the plurality of live streaming rooms being greater than the second threshold and less than or equal to the first threshold, an anchor account in the live streaming room to the second account list.

According to another aspect of the embodiments of the present disclosure, an apparatus for determining a media server is provided. The apparatus includes: a receiving unit, configured to receive a live streaming access request from a target account, the live streaming access request being initiated for accessing a live streaming room; an audience number type determining unit, configured to determine an audience number type of an anchor account in the live streaming room, the audience number type indicating a number of online audiences in the live streaming room; a media server determining unit, configured to determine a target media server matching the audience number type; and a transmitting unit, configured to transmit, based on the target media server, a live video stream in the live streaming room to a terminal from which the target account is logged in.

According to still another aspect of the embodiments of the present disclosure, a server is provided. The server includes: a processor; and a memory configured to store at least one instruction executable by the processor. The processor, when loading and executing the at least one instruction, is caused to perform a method including: receiving a live streaming access request from a target account, the live streaming access request being initiated for accessing a live streaming room; determining an audience number type of an anchor account in the live streaming room, the audience number type indicating a number of online audiences in the live streaming room; determining a target media server matching the audience number type; and transmitting, based on the target media server, a live video stream in the live streaming room to a terminal from which the target account is logged in.

In some embodiments, determining the audience number type of the anchor account in the live streaming room includes: determining, in response to the anchor account belonging to either a first account list or a second account list, the audience number type of the anchor account as an audience number type corresponding to the list to which the anchor account belongs, wherein the first account list stores a plurality of accounts corresponding to a first audience number type, and the first audience number type indicates that the number of online audiences in the live streaming room is greater than a first threshold; the second account list stores a plurality of accounts corresponding to a second audience number type, and the second audience number type indicates that the number of online audiences in the live streaming room is greater than a second threshold and is less than or equal to the first threshold.

In some embodiments, determining the audience number type of the anchor account in the live streaming room includes: determining the audience number type of the anchor account as a third audience number type in response to the anchor account belonging to neither the first account list nor the second account list, the third audience number type indicating that the number of online audiences in the live streaming room is less than or equal to the second threshold.

In some embodiments, determining the audience number type of the anchor account in the live streaming room includes: selecting one media server from a plurality of media servers as the target media server in response to the audience number type of the anchor account being the first audience number type.

In some embodiments, selecting one media server from the plurality of media servers as the target media server includes: randomly selecting one media server from the plurality of media servers as the target media server in response to the audience number type of the anchor account being the first audience number type.

In some embodiments, determining the target media server matching the audience number type includes: selecting a target number of media servers from a plurality of media servers based on the anchor account and a total number of the plurality of media servers and selecting one media server from the target number of media servers as the target media server, in response to the audience number type of the anchor account being the second audience number type.

In some embodiments, selecting the target number of media servers from the plurality of media servers and selecting one media server from the target number of media servers as the target media server include: acquiring last target digits of the anchor account in response to the audience number type of the anchor account being the second audience number type; acquiring a remainder corresponding to the anchor account by dividing the last target digits of the anchor account by the total number of the plurality of media servers; selecting, from the plurality of media servers, a media server with a serial number being the remainder; acquiring the target number of media servers by using the serial number of the media server as a starting serial number; and selecting one media server from the target number of media servers as the target media server.

In some embodiments, determining the target media server matching the audience number type includes: selecting, in response to the audience number type of the anchor account being the third audience number type, one media server from a plurality of media servers as the target media server based on the anchor account and a total number of the plurality of media servers.

In some embodiments, selecting one media server from the plurality of media servers as the target media server includes: acquiring last target digits of the anchor account in response to the audience number type of the anchor account being the third audience number type; acquiring a remainder corresponding to the anchor account by dividing the last target digits of the anchor account by the total number of the plurality of media servers; and selecting, from the plurality of media servers, a media server with a serial number being the remainder as the target media server.

In some embodiments, in response to receiving the live streaming access request from the target account, the method further includes: detecting numbers of online audiences of a plurality of live streaming rooms at target intervals; and updating a corresponding list in the first account list and the second account list based on the numbers of online audiences of the plurality of live streaming rooms.

In some embodiments, updating the corresponding list in the first account list and the second account list includes: adding, in response to a number of online audiences of any live streaming room in the plurality of live streaming rooms being greater than the first threshold, an anchor account in the live streaming room to the first account list; and adding, in response to a number of online audiences of any live streaming room in the plurality of live streaming rooms being greater than the second threshold and less than or equal to the first threshold, an anchor account in the live streaming room to the second account list.

According to yet another aspect of the embodiments of the present disclosure, a storage medium storing at least one instruction therein is provided. The at least one instruction, when loaded and executed by a processor of a server, causes the server to perform the method described above.

According to still yet another aspect of the embodiments of the present disclosure, a computer program product including at least one computer instruction therein is provided. The at least one computer instruction is stored in a computer readable storage medium. The at least one computer instruction, when read and executed by a processor of a server, causes the server to perform the method described above.

It should be understood that the above general description and the detailed description in the following text are only exemplary and explanatory, and should not be construed as a limitation to the present disclosure.

BRIEF DESCRIPTION OF THE DRAWINGS

The accompanying drawings, which are incorporated in and constitute a part of this description, illustrate the examples of the present disclosure and together with the description, serve to explain the principles of the present disclosure, but do not constitute any improper limitation on the present disclosure.

DETAILED DESCRIPTION

For better understanding of the technical solutions of the present disclosure by those of ordinary skill in the art, the technical solutions in the embodiments of the present disclosure are hereinafter clearly and completely described with reference to the accompanying drawings.

It should be noted that the terms "first," "second," and the like in the specification and claims of the present disclosure and in the accompanying drawings are intended to distinguish between similar objects but do not necessarily indicate a specific order or sequence. It should be understood that the data used in such a way may be exchanged under proper conditions to make it possible to implement the described embodiments of present disclosure in sequences except those illustrated or described herein. The practice described in the following exemplary embodiments do not represent all embodiments consistent with the present disclosure. On the contrary, these exemplary embodiments are only embodiments of an apparatus and a method detailed in the appended claims and consistent with some aspects of the present disclosure.

Data involved in the present disclosure may be data authorized by users or fully authorized by various parties.

Figure 1:
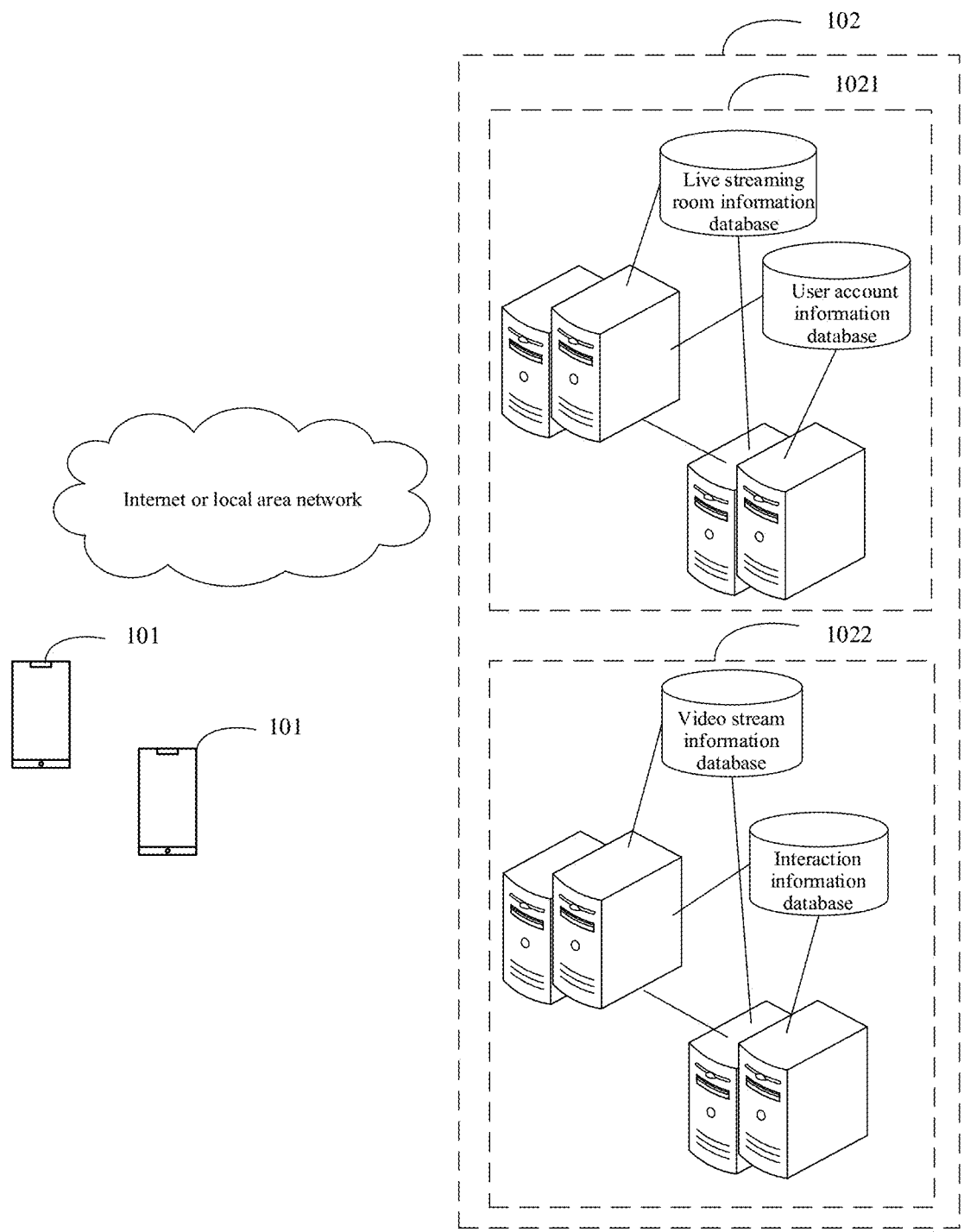
FIG. 1 is a schematic diagram of an implementation environment of a method for determining a media server according to an exemplary embodiment.

FIG. 1 is a schematic diagram of an implementation environment of a method for determining a media server according to an exemplary embodiment. Referring to FIG. 1, the implementation environment includes: a terminal 101 and a server 102.

The terminal 101 may be at least one of a smartphone, a smartwatch, a desktop computer, a notebook computer, a virtual reality terminal, an augmented reality terminal, a wireless terminal, and a laptop computer, etc. A live streaming application may be installed on the terminal 101. The terminal 101 has a communication function and may access the Internet. The terminal 101 may generally refer to one of a plurality of terminals, and this embodiment is illustrated by using the terminal 101 as an example. A person skilled in the art may understand that there may be more or fewer terminals.

The server 102 may be an independent physical server, or a server cluster or distributed file system composed of multiple physical servers, or a cloud server providing basic cloud computing services such as cloud services, cloud database, cloud computing, cloud function, cloud storage, network services, cloud communication, middleware services, domain name services, security services, content delivery network (CDN), big data and an artificial intelligence platform. The server 102 and the terminal 101 may be connected directly or indirectly through wired or wireless communication, which is not limited in the embodiments of the present disclosure. In some embodiments, more or fewer servers 102 may be deployed, which is not limited in the embodiments of the present disclosure. The server 102 may also include other functional servers to provide more comprehensive and diverse services. In the embodiments of the present disclosure, two types of servers are provided: a platform server 1021 and a media server 1022. The platform server 1021 may be a backend server of a live streaming application, configured to assign a media server 1022 to each user account that accesses a live streaming room. A live streaming room information database and a user account information database may be run on the platform server 1021. The live streaming room information database stores live streaming room information of a plurality of live streaming rooms, wherein the live streaming room information may be an anchor account, a live streaming room identification (ID), and other information; and the user account information database stores account information of a plurality of users, such as user accounts, passwords, and other information. The media server 1022 may be a server providing media services to user accounts, and is specifically configured to provide services of transmitting live video streams and performing corresponding interaction content in response to interaction requests from the user accounts, wherein the interaction content may be commenting, gift-giving, or the like.

It should be understood that when the platform server 1021 assigns a media server 1022 to each user account accessing the live streaming room, the assignment may be realized by distributing media service domain names, i.e., distributing a media service domain name to each user account accessing the live streaming room, such that the terminal 101 from which the user account is logged in is associated with the domain name to implement the functions of transmitting a live video stream and performing interaction through a media server corresponding to the domain name. The media service domain name is a name of a media server or a group of media servers on the Internet.

In the process of implementing the embodiments of the present disclosure, when a user wants to access a certain live streaming room, the user may operate on the terminal 101 to start the live streaming application. The user may search for the live streaming room to be accessed in a search box displayed on an interface of the live streaming application. Then the interface of the live streaming application displays relevant information in the live streaming room and an option to enter the live streaming room. The user may click or tap on the option to enter the live streaming room to trigger the terminal 101 to send a live streaming access request to the platform server 1021. Then the platform server 1021 receives the live streaming access request, and determines, by using the method for determining the media server according to the embodiments of the present disclosure, a media server 1022 that provides media services to the user. In this way, the user is provided with the services of transmitting a live video stream and performing interaction through the media server 1022.

Figure 2:
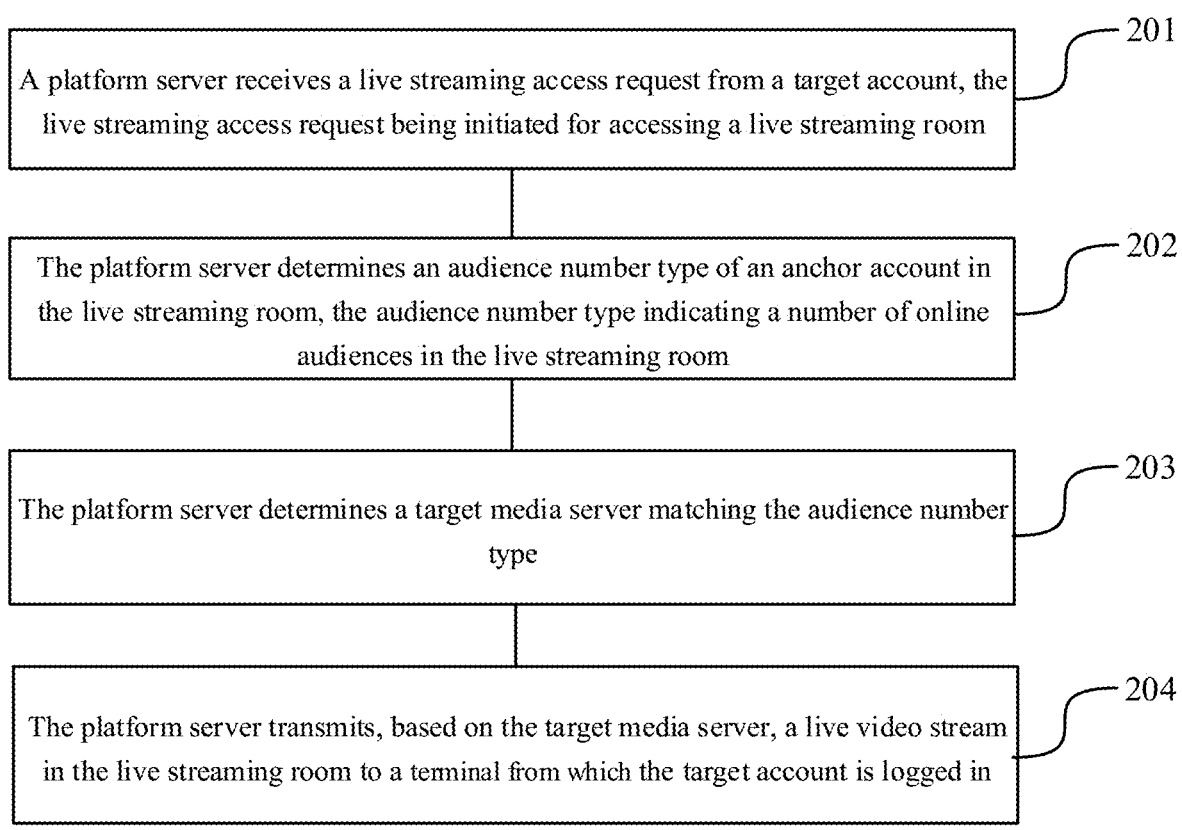
FIG. 2 is a flowchart of a method for determining a media server according to an exemplary embodiment.

FIG. 2 is a flowchart of a method for determining a media server according to an exemplary embodiment. As shown in FIG. 2, description is made by using an example in which the method is executed by a platform server. The method includes the following processes.

In 201, a platform server receives a live streaming access request from a target account, wherein the live streaming access request is initiated for accessing a live streaming room.

In 202, the platform server determines an audience number type of an anchor account in the live streaming room, wherein the audience number type indicates a number of online audiences in the live streaming room.

In 203, the platform server determines a target media server matching the audience number type.

In 204, the platform server transmits, based on the target media server, a live video stream in the live streaming room to a terminal from which the target account is logged in.

In the technical solutions according to the embodiments of the present disclosure, each single media server maintains a relatively uniform number of live streaming rooms, thereby preventing one media server from providing services to too many live streaming rooms and improving the accuracy of determining the media server. Further, when a live video stream is transmitted based on the media server, required bandwidth resources and memory resources are greatly reduced.

Figure 3:
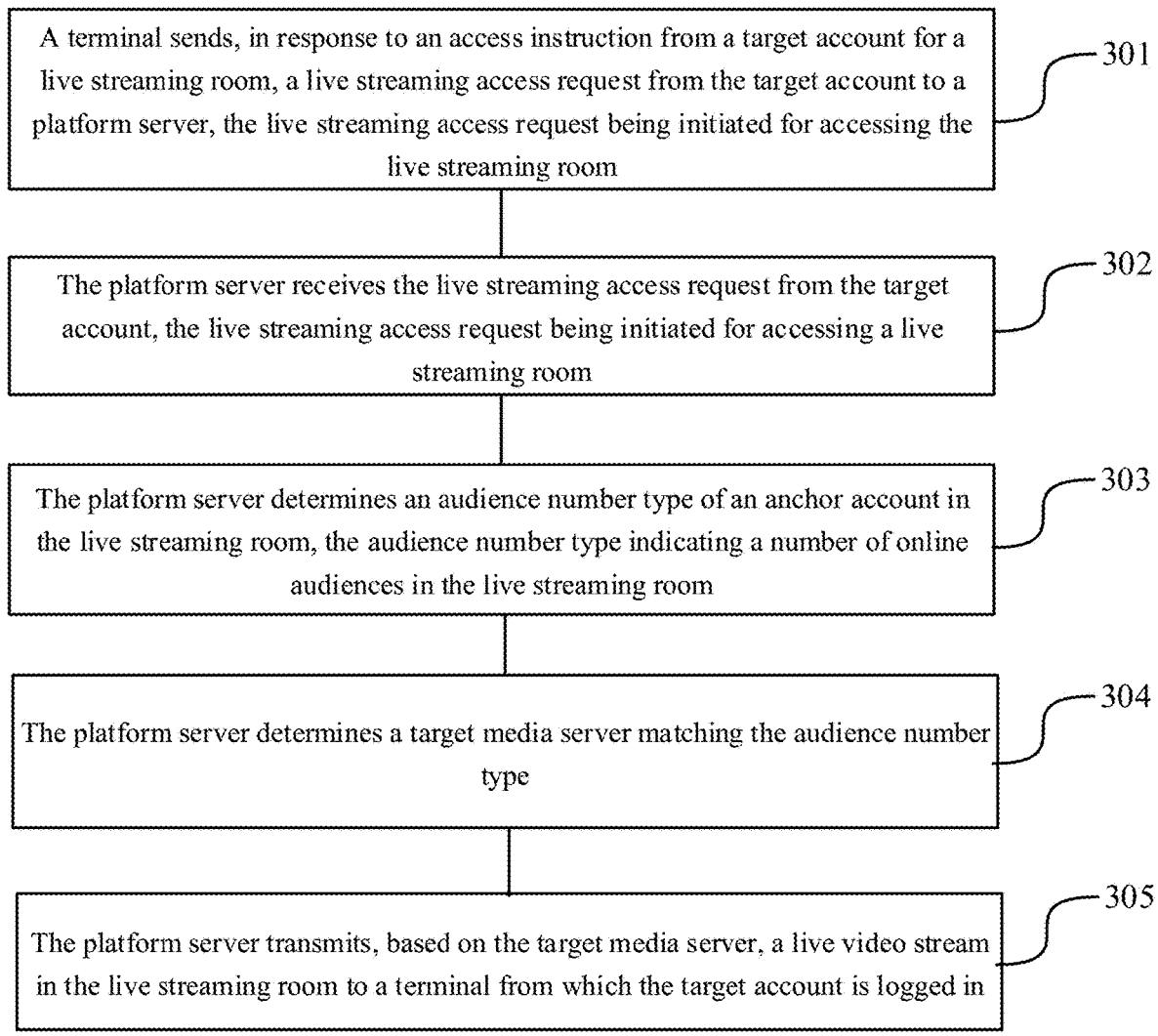
FIG. 3 is a flowchart of a method for determining a media server according to an exemplary embodiment.

FIG. 2 merely shows a basic process of a method for determining a media server according to the present disclosure. The following further illustrates the solution according to the present disclosure. FIG. 3 is a flowchart of a method for determining a media server according to an exemplary embodiment. As shown in FIG. 3, description is made by using an example in which the method is executed by a platform server. The method includes the following processes.

In 301, a terminal sends, in response to an access instruction from a target account for a live streaming room, a live streaming access request from the target account to a platform server, wherein the live streaming access request is initiated for accessing the live streaming room.

The target account indicates a user account that is going to access the live streaming room, and the user account is a string of digits used to represent identity information of the user. For example, the target account refers to an account corresponding to an audience user. The live streaming access request carries a live streaming room ID and a target account. In some embodiments, the live streaming room ID is a string of digits.

In some embodiments, when a user wants to access a live streaming room, the user operates on the terminal to enter a live streaming application, and clicks or tap on the live streaming room to be accessed among a plurality of live streaming rooms displayed on the interface of the live streaming application. The terminal triggers an access instruction from the target account for the live streaming room in response to the click or tap operation of the user, generates a live streaming access request based on the target account and the live streaming room ID, and sends the live streaming access request to the platform server.

In some embodiments, in response to entering the live streaming application, the user searches for a live streaming room to be accessed in a search box displayed on the interface of the live streaming application. Then, relevant information in the live streaming room and an option to enter the live streaming room are displayed on the interface of the live streaming application. The user clicks or taps on the option to enter the live streaming room. The terminal triggers an access instruction from the target account for the live streaming room in response to the click or tap operation of the user, and further sends the live streaming access request to the platform server subsequently.

A process of accessing a live streaming room is described above by using an access method of clicking or tapping on one of a plurality of live streaming rooms and an access method of searching for a live streaming room as examples. The user may access a live streaming room by using other access methods, for example, clicking or tapping on a live streaming link. A specific access method is not limited in the embodiments of the present disclosure.

In 302, the platform server receives the live streaming access request from the target account, wherein the live streaming access request is initiated for accessing a live streaming room.

In some embodiments, the platform server receives the live streaming access request from the target account, acquires the target account and live streaming room ID carried in the live streaming access request, and acquire an anchor account corresponding to the live streaming room ID by querying in a live streaming room information database based on the live streaming room ID, such that the subsequent process is performed based on the anchor account.

In 303, the platform server determines an audience number type of an anchor account in the live streaming room, wherein the audience number type indicates a number of online audiences in the live streaming room.

The audience number type includes a first audience number type, a second audience number type, and a third audience number type. The first audience number type indicates that the number of online audiences in the live streaming room is greater than a first threshold; the second audience number type indicates that the number of online audiences in the live streaming room is greater than a second threshold and less than or equal to the first threshold; and the third audience number type indicates that the number of online audiences in the live streaming room is less than or equal to the second threshold. The first threshold and the second threshold are both preset thresholds, and the first threshold is greater than the second threshold. The number of online audiences indicates the number of user accounts that have entered the live streaming room. It should be noted that, the first audience number type corresponds to an anchor account of a live streaming room with a mega number of online audiences; the second audience number type corresponds to an anchor account of a live streaming room with a large number of online audiences; and the third audience number type corresponds to an anchor account of a live streaming room with a small number of online audiences. In some embodiments, the first audience number type is a superstar anchor type, the second audience number type is a top anchor type, and the third audience number type is a little anchor type. For example, when the first threshold is 100000 and the second threshold is 10000, the number of online audiences in the live streaming room of the first audience number type (superstar anchor type) is greater than 100000, the number of online audiences in the live streaming room of the second audience number type (top anchor type) is greater than 10000 and less than or equal to 100000, and the number of online audiences in the live streaming room of the third audience number type (little anchor type) is less than or equal to 10000.

In some embodiments, in response to determining the anchor account according to the live streaming room ID carried in the live streaming access request, the platform server determines, in response to the anchor account belonging to either a first account list or a second account list, the audience number type of the anchor account as an audience number type corresponding to the list to which the anchor account belongs, or determines, in response to the anchor account belonging to neither the first account list nor the second account list, the audience number type of the anchor account as the third audience number type. The first account list stores a plurality of accounts corresponding to the first audience number type, that is, a plurality of accounts corresponding to live streaming rooms with numbers of online audiences greater than the first threshold. The second account list stores a plurality of accounts corresponding to the second audience number type, that is, a plurality of accounts corresponding to live streaming rooms with numbers of online audiences greater than the second threshold and less than or equal to the first threshold.

In some embodiments, a specific process of determining the audience number type of the anchor account by the platform server is as follows: determining whether the anchor account in the live streaming room exists in the first account list by querying in the first account list based on the anchor account in the live streaming room, and determining the audience number type of the anchor account as the first audience number type in response to determining that the anchor account exists in the first account list. In response to determining that the anchor account does not exist in the first account list, the platform server determines whether the anchor account in the live streaming room exists in the second account list by querying in the second account list, and determines the audience number type of the anchor account as the second audience number type in response to determining that the anchor account exists in the second account list. In response to determining that the anchor account exists in neither the first account list nor the second account list, the audience number type of the anchor account is determined as the third audience number type. This process is merely described by using an example of querying in the first account list first and then querying in the second account list. In some other embodiments, the platform server may determine the audience number type of the anchor account by first querying in the second account list and then querying in the first account list. A specific order of the queries is not limited in the embodiments of the present disclosure.

It should be noted that the first account list and the second account list may be stored in a Zoo Keeper, which is an open source distributed component. In some embodiments, the Zoo Keeper is a set of control servers among a plurality of media servers, and is configured to store the first account list and the second account list. In this embodiment of the present disclosure, the first account list and the second account list are used for storing accounts of the first audience number type and the second audience number type. For an anchor account of any live streaming room, the audience number type corresponding to the anchor account in the live streaming room may be determined by determining whether the anchor account is in the first account list and the second account list.

In some embodiments, the platform server may further periodically detect numbers of online audiences of a plurality of live streaming rooms, and update a corresponding list in the first account list and the second account list based on the numbers of online audiences of the plurality of live streaming rooms. A corresponding process is as follows. The platform server detects numbers of online audiences of a plurality of live streaming rooms at target intervals, and compares the numbers of online audiences of the plurality of live streaming rooms with the first threshold and the second threshold. In response to determining that a number of online audiences of any live streaming room in the plurality of live streaming rooms is greater than the first threshold, the platform server adds an anchor account in the live streaming room to the first account list. In response to determining that a number of online audiences of any live streaming room in the plurality of live streaming rooms is greater than the second threshold and less than or equal to the first threshold, the platform server adds an anchor account in the live streaming room to the second account list. The target interval is a fixed interval specified in advance, such as 1 minute.

In some embodiments, in the above-mentioned case where the number of online audiences in the live streaming room is greater than the first threshold, in response to adding the anchor account in the live streaming room to the first account list, whether the anchor account in the live streaming room exists in the second account list is determined. In response to determining that the anchor account exists in the second account list, the anchor account is deleted from the second account list. In response to determining that the anchor account does not exist in the second account list, the deleting operation is not required. In some embodiments, for the above-mentioned case where the number of online audiences in the live streaming room is greater than the second threshold and less than or equal to the first threshold, in response to adding the anchor account in the live streaming room to the second account list, whether the anchor account in the live streaming room exists in the first account list is determined. In response to determining that the anchor account exists in the first account list, the anchor account is deleted from the first account list. In response to determining that the anchor account does not exist in the first account list, no deleting operation is needed.

In some embodiments, in response to determining the relationship between the number of online audiences in the live streaming room and the first threshold as well as the second threshold, the platform server first determines whether the anchor account in the live streaming room exists in the account list corresponding to the interval relationship, and then performs the subsequent add and deleting operations based on the query result. The corresponding process is as follows. In the above-mentioned case where the number of online audiences in the live streaming room is greater than the first threshold, the platform server determines whether the anchor account in the live streaming room exists in the first account list. In response to determining that the anchor account in the live streaming room does not exist in the first account list, the platform server adds the anchor account to the first account list and deletes the anchor account from the second account list. In response to determining that the anchor account in the live streaming room exists in the first account list, no adding or deleting operation is needed. In the above-mentioned case where the number of online audiences in the live streaming room is greater than the second threshold and less than or equal to the first threshold, the platform server determines whether the anchor account in the live streaming room exists in the second account list. In response to determining that the anchor account in the live streaming room does not exist in the second account list, the platform server adds the anchor account to the second account list and deletes the anchor account from the first account list. In response to determining that the anchor account in the live streaming room exists in the second account list, no adding or deleting operation is needed.

It should also be noted that the above process of updating the first account list and the second account list in real time may be performed by a Live Stream Super Star Scan Task, which is a timed task that may run once every target interval. By setting a timed task to maintain the first account list and the second account list, it is ensured that the first account list and the second account list are updated in real time.

In some embodiments, description is given by using the case that the first threshold is 100000, the second threshold is 10000, and the target interval is 1 minute as an example. The first account list is a Top Star list, and the second account list is a Super Star list. The Live Stream Super Star Scan Task runs once every minute to detect the numbers of online audiences of the current online live streaming rooms. In response to determining that the number of online audiences of a live streaming room is greater than 100000, the anchor account in the live streaming room is added to the Top Star list, and in response to determining that the anchor account in the live streaming room exists in the Super Star list, the anchor account in the live streaming room is deleted from the Super Star list. In response to determining that the number of online audiences of a live streaming room is greater than 10000 and less than or equal to 100000, the anchor account in the live streaming room is added to the Super Star list, and in response to determining that the anchor account in the live streaming room exists in the Top Star list, the anchor account in the live streaming room is deleted from the Top Star list.

Process 303 is illustrated by using an example of maintaining a first account list and a second account list, and then querying in the first account list and the second account list to determine the audience number type corresponding to the anchor account. In some other embodiments, in response to receiving a live streaming access request from the target account, the platform server acquires the current number of online audiences in the live streaming room corresponding to the live streaming access request, compares the number of online audiences with the first threshold and the second threshold, and then determines the audience number type corresponding to the live streaming room based on the comparison result. For example, in response to determining that the current number of online audiences in the live streaming room is greater than the first threshold, the audience number type corresponding to the live streaming room is determined as the first audience number type; in response to determining that the current number of online audiences in the live streaming room is greater than the second threshold and less than or equal to the first threshold, the audience number type corresponding to the live streaming room is determined as the second audience number type; and in response to determining that the current number of online audiences in the live streaming room is less than or equal to the second threshold, the audience number type corresponding to the live streaming room is determined as the third audience number type. That is, the platform server acquires the number of online audiences in the live streaming room each time a live streaming access request for the live streaming room is received, and determines an audience number type corresponding to the live streaming room based on the number of online audiences.

In 304, the platform server determines a target media server matching the audience number type.

The target media server is a media server to be assigned to the target account.

Target media servers matching the first audience number type, the second audience number type, and the third audience number type may be determined as follows.

In one exemplary embodiment, the platform server selects one media server from a plurality of media servers as the target media server in response to the audience number type of the anchor account being the first audience number type.

In some embodiments, the process of determining the target media server by the platform server is as follows: the platform server randomly selects one media server from the plurality of media servers as the target media server in response to the audience number type of the anchor account being the first audience number type. The plurality of media servers are all the media servers. By randomly assigning one of all the media servers to the target account accessing the live streaming room of the first audience number type, audiences in the live streaming room are randomly dispersed on all the media servers, i.e., it may be ensured that the audiences in the live streaming room of the superstar anchor type are randomly dispersed on all the media servers.

In another exemplary embodiment, the platform server selects a target number of media servers from a plurality of media servers based on the anchor account and a total number of the plurality of media servers and selects one media server from the target number of media servers as the target media server, in response to the audience number type of the anchor account being the second audience number type.

The target number is a preset fixed number, such as 10. The target number is any integer greater than or equal to 1. For example, the target number is 10.

In some embodiments, the specific process of determining the target media server by the platform server is as follows: the platform server acquires last target digits of the anchor account in response to the audience number type of the anchor account being the second audience number type, the last target digits being used to represent a fixed number of last digits of the anchor account, such as last four digits, wherein the last target digits represent an integer greater than or equal to 1 and less than or equal to an integer represented by the total digits of the anchor account. A remainder corresponding to the anchor account is acquired by dividing the integer represented by the last target digits of the anchor account by the total number of the plurality of media servers. A media server with a serial number being the remainder is selected from the plurality of media servers. By using the serial number of the media server as a starting serial number, the target number of media servers is acquired, wherein the target number is an integer greater than or equal to 1, and one media server is randomly selected from the target number of media servers as the target media server. In some embodiments, the operation of acquiring the target number of media servers by using the serial number of the media server as a starting serial number includes: by using the serial number of the media server as the starting serial number, sequentially determining the target number of media servers with consecutive serial numbers in an ascending order or descending order as the target media servers.

In some embodiments, the process of determining the target media server by the platform server is as follows: in response to the audience number type of the anchor account being the second audience number type, the platform server acquires the last target digits of the anchor account, wherein the last target digits represent an integer greater than or equal to 1 and less than or equal to an integer represented by the total digits of the anchor account, acquires a remainder corresponding to the anchor account by dividing the last target digits of the anchor account by the total number of the plurality of media servers, acquires one media server in a target number of media servers by selecting a media server with a serial number being the remainder from the plurality of media servers, then takes the remainder by using the total number of the plurality of media servers again and increments the remainder by one to acquire a value, selects a media server with a serial number being the acquired value from the plurality of media servers. The above remainder process is repeated for target times, thus acquiring the target number of media servers, and a media server is randomly selected from the target number of media servers as the target media server. In this process, a remainder is acquired by dividing the integer represented by the fixed last digits of the anchor account by the total number of media servers, the remainder is incremented by one each time, and the remainder process is looped for target times, until a number of values equal to the target number is reached. Then corresponding media servers with serial numbers being the values are selected, thereby acquiring the target number of media servers. It should be noted that before the solution is implemented, all the media servers are numbered, for example, 50 media servers are numbered in order from 0 to 49.

In some embodiments, for example, the total number of the plurality of media servers is 50, the target number is 10, and the last target digits are the last four digits. In response to the anchor account being 9978***5354, the last target digits of the anchor account are 5354. In some embodiments, a remainder of 4 is acquired by dividing the number of 5354 at the last target digits of the anchor account by the total number of 50 of the plurality of media servers. Then, a media server with a serial number being 4 is selected from the plurality of media servers, and 10 media servers are acquired by using the serial number of 4 as the starting serial number. In this case, the serial numbers of the 10 media servers are 4, 5 . . . 12, 13, and one media server is randomly selected from the 10 media servers as the target media server. In some embodiments, a remainder of 4 is acquired by dividing the number of 5354 at the last target digits of the anchor account by the total number of 50 of the plurality of media servers. The remainder of 4 is incremented by one to acquire a value of 5, and the cycle is performed 9 times, and 10 values are thus acquired, which are 4, 5 . . . 12, 13. Then, 10 media servers with serial numbers being 4, 5 . . . 12, 13 are selected from the plurality of media servers, and one media server is randomly selected from the 10 media servers as the target media server.

It should be understood that for live streaming rooms of the second audience number type, different live streaming rooms correspond to different target numbers of media servers because different live streaming rooms have different anchor accounts. For example, according to the above example, in the case that the anchor account in the live streaming room is 1429***8649, the last target digits of the anchor account are 8649, and a remainder acquired by dividing the last target digits of 8649 of the anchor account by the total number of 50 of the plurality of media servers is 49. In this case, a media server with a serial number being 49 is selected from the plurality of media servers, 10 media servers are acquired by using the serial number of 49 as the starting serial number, and the serial numbers of the 10 media servers are 49, 0 . . . 7, 8 respectively. According to the above example, it may be found that different live streaming rooms correspond to different 10 media servers.

It should also be understood that in the embodiments described above, in the process of acquiring a target number of media servers by using a serial number of a media server as a starting serial number, in response to the starting serial number being from the last serial numbers of the plurality of media servers, the target number of media servers may be acquired cyclically in the serial numbers of the plurality of media servers. For example, in the above example, in the case that the starting serial number is the serial number of 49, which is the last one of the serial numbers of the plurality of media servers, it is possible to continue to acquire 9 media servers starting from the serial number of 0. In the above embodiments, in response to a value determined being greater than the largest one of the serial numbers of the plurality of media servers during a number of cycles acquired by subtracting one from a target number of cycles, a remainder value is acquired by dividing the value by the total number of the plurality of media servers again, and a corresponding media server with a serial number being the remainder value is selected from the plurality of media servers. For example, according to the above example, a remainder of 49 is acquired by dividing the number of 8649 at the last target digits of the anchor account by the total number of 50 of the plurality of media servers; a value of 50 is acquired by adding one to the remainder of 49, the cycle is performed 9 times, and thus 10 values are acquired, which are 49, 50, 51 . . . 57, 58. It may be found that among the 10 values, there are 9 values greater than the largest one of the serial numbers of the plurality of media servers, which are 50, 51 . . . 57, 58, respectively. The 9 values are divided by the total number of 50 of the plurality of media servers again and 9 remainder values are acquired, which are 0, 1, 2 . . . 7, 8. Then, 10 media servers with serial numbers being 49, 0 . . . 7, 8 are selected from the plurality of media servers.

By randomly assigning one of the target number of media servers to the target account accessing the live streaming room of the second audience number type, audiences in the live streaming room are randomly dispersed on the target number of media servers, i.e., it is ensured that the audiences in the live streaming room of the top anchor type are randomly dispersed on a fixed number of media servers. For example, the audiences in the live streaming room in the above example are randomly dispersed on 10 media servers.

In still another example, the platform server selects, in response to the audience number type of the anchor account being the third audience number type, one media server from a plurality of media servers as the target media server based on the anchor account and a total number of the plurality of media servers.

In some embodiments, determining the target media server by the platform server includes: the platform server acquires last target bits of the anchor account in response to the audience number type of the anchor account being the third audience number type, wherein the last target digits represent an integer greater than or equal to 1 and less than or equal to an integer represented by the total digits of the anchor account, acquires a remainder corresponding to the anchor account by dividing the last target digits of the anchor account by the total number of the plurality of media servers, and selects a media server with a serial number being the remainder from the plurality of media servers as the target media server.

In some embodiments, description is given by using the case that the total number of the plurality of media servers is 50, the target number is 10, and the last target digits are the last four digits as an example. In response to the anchor account being 9978****5354, the last target digits of the anchor account are 5354. A remainder of 4 is acquired by dividing the number of 5354 at the last target digits of the anchor account by the total number of 50 of the plurality of media servers, and then a media server with a serial number being 4 is selected from the plurality of media servers as the target media server. It should be understood that, for live streaming rooms of the third audience number type, different live streaming rooms correspond to different fixed media servers because different live streaming rooms correspond to different anchor accounts.

By assigning a fixed one media server to the target account accessing the live streaming room of the third audience number type, audiences of the live stream are retained on one media server, i.e., it is ensured that the audiences in the live streaming room of the little anchor type are fixed on one media server. For example, the audiences in the live streaming room in the above example are retained on the media server with the serial number of 4.

It should be noted that, in live streaming applications, the number of online audiences of each live streaming room is generally stable. For example, in the case that the maximum number of online audiences of a live streaming room is 5000 at one time, the maximum number of online audiences in the live streaming room is likely to be around 5000 at the next live streaming. Moreover, in the live streaming applications, the live streaming rooms of the superstar anchor type, the top anchor type and the little anchor type are in a pyramid distribution, that is, 99.9% of the anchors are little anchors, 0.09% of the anchors are top anchors, and 0.01% of the anchors are superstar anchors. Therefore, by using the method for determining a target media server in 304A, 304B, and 304C, for a viewer of a live streaming room of the superstar anchor type, one of all the media servers is assigned to the viewer; for a viewer of a live streaming room of the top anchor type, a fixed number of media servers corresponding to the live streaming room are determined, and one of the fixed number of media servers is assigned to the viewer; and for a viewer of a live streaming room of the little anchor type, one fixed media server corresponding to the live streaming room is determined and assigned to the viewer. In this way, it may be ensured that each single media server carries a uniform number of online audiences, and also maintains a uniform number of online live streaming rooms.

In 305, the platform server transmits, based on the target media server, a live video stream in the live streaming room to a terminal from which the target account is logged in.

The target media server is configured to pull the live video stream in the live streaming room for the target account and to perform the corresponding interaction content in response to the interaction request from the target account.

In some embodiments, in response to the target media server being determined by the platform server, the platform server assigns the target media server to the target account, transmits the live video stream in the live streaming room through the target media server to the terminal from which the target account is logged in, and performs corresponding interaction content, such as commenting, gift-giving, and other interactions, in response to the interaction request from the target account.

Processes 301 to 305 are illustrated by using an example of determining the audience number type by querying in a list according to the anchor account of the live broadcast room, and then determining the target media server matching the audience number type based on the anchor account. In some other embodiments, the platform server may also determine the audience number type based on the live streaming room ID, and then determine the target media server matching the audience number type based on the live streaming room ID.

In the technical solutions according to the embodiments of the present disclosure, each single media server maintains a relatively uniform number of live streaming rooms, thereby preventing one media server from corresponding to too many live streaming rooms and improving the accuracy of determining the media server. Therefore, when a live video stream is transmitted based on the media server, required bandwidth resources and memory resources are greatly reduced.

Figure 4:
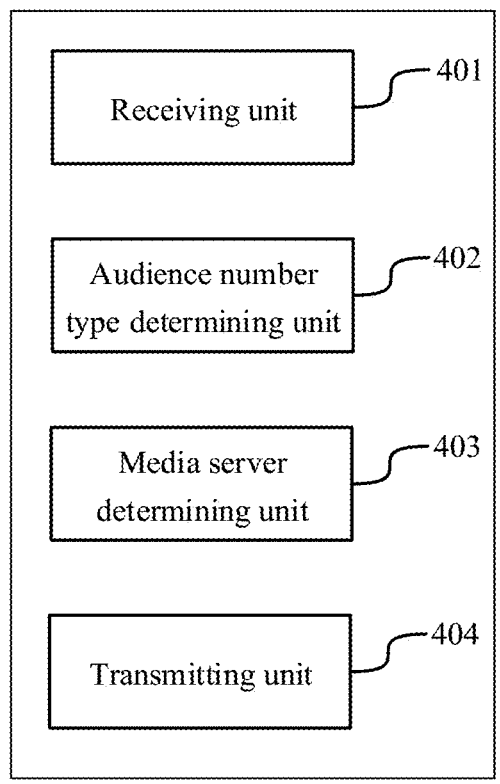
FIG. 4 is a block diagram of an apparatus for determining a media server according to an exemplary embodiment.

FIG. 4 is a block diagram of an apparatus for determining a media server according to an exemplary embodiment. Referring to FIG. 4, the apparatus includes a receiving unit 401, an audience number type determining unit 402, a media server determining unit 403, and a transmitting unit 404.

The receiving unit 401 is configured to receive a live streaming access request from a target account, the live streaming access request being initiated for accessing a live streaming room.

The audience number type determining unit 402 is configured to determine an audience number type of an anchor account in the live streaming room, the audience number type indicating a number of online audiences in the live streaming room.

The media server determining unit 403 is configured to determine a target media server matching the audience number type.

The transmitting unit 404 is configured to transmit, based on the target media server, a live video stream in the live streaming room to a terminal from which the target account is logged in.

In some embodiments, the audience number type determining unit 402 is configured to: determine, in response to the anchor account belonging to either a first account list or a second account list, the audience number type of the anchor account as an audience number type corresponding to the list to which the anchor account belongs.

Here, the first account list stores a plurality of accounts corresponding to a first audience number type, and the first audience number type indicates that the number of online audiences in the live streaming room is greater than a first threshold; and the second account list stores a plurality of accounts corresponding to a second audience number type, and the second audience number type indicates that the number of online audiences in the live streaming room is greater than a second threshold and is less than or equal to the first threshold.

In some embodiments, the audience number type determining unit 402 is further configured to: determine the audience number type of the anchor account as a third audience number type in response to the anchor account belonging to neither the first account list nor the second account list, the third audience number type indicating that the number of online audiences in the live streaming room is less than or equal to the second threshold.

In some embodiments, the media server determining unit 403 includes: a first media server determining subunit, configured to select one media server from a plurality of media servers as the target media server in response to the audience number type of the anchor account being the first audience number type.

In some embodiments, the first media server determining subunit is configured to: randomly select one media server from the plurality of media servers as the target media server in response to the audience number type of the anchor account being the first audience number type.

In some embodiments, the media server determining unit 403 further includes: a second media server determining subunit, configured to select a target number of media servers from a plurality of media servers based on the anchor account and a total number of the plurality of media servers and select one media server from the target number of media servers as the target media server, in response to the audience number type of the anchor account being the second audience number type.

In some embodiments, the second media server determining subunit is configured to: acquire last target digits of the anchor account in response to the audience number type of the anchor account being the second audience number type; acquire a remainder corresponding to the anchor account by dividing the last target digits of the anchor account by the total number of the plurality of media servers; select, from the plurality of media servers, a media server with a serial number being the remainder; acquire the target number of media servers by using the serial number of the media server as a starting serial number; and select one media server from the target number of media servers as the target media server.

In some embodiments, the media server determining unit 403 further includes: a third media server determining subunit, configured to select, in response to the audience number type of the anchor account being the third audience number type, one media server from a plurality of media servers as the target media server based on the anchor account and a total number of the plurality of media servers.

In some embodiments, the third media server determining subunit is configured to: acquire last target digits of the anchor account in response to the audience number type of the anchor account being the third audience number type; acquire a remainder corresponding to the anchor account by dividing the last target digits of the anchor account by the total number of the plurality of media servers; select, from the plurality of media servers, a media server with a serial number being the remainder as the target media server.

In some embodiments, the apparatus further includes: a detecting unit, configured to detect numbers of online audiences of a plurality of live streaming rooms at target intervals; and an updating unit, configured to update a corresponding list in the first account list and the second account list based on the numbers of online audiences of the plurality of live streaming rooms.

In some embodiments, the updating unit is configured to: add, in response to a number of online audiences of any live streaming room in the plurality of live streaming rooms being greater than the first threshold, an anchor account in the live streaming room to the first account list; and add, in response to a number of online audiences of any live streaming room in the plurality of live streaming rooms being greater than the second threshold and less than or equal to the first threshold, an anchor account in the live streaming room to the second account list.

In the technical solutions according to the embodiments of the present disclosure, each single media server maintains a relatively uniform number of live streaming rooms, thereby preventing one media server from corresponding to too many live streaming rooms and improving the accuracy of determining the media server. Therefore, when a live video stream is transmitted based on the media server, required bandwidth resources and memory resources are greatly reduced.

Figure 5:
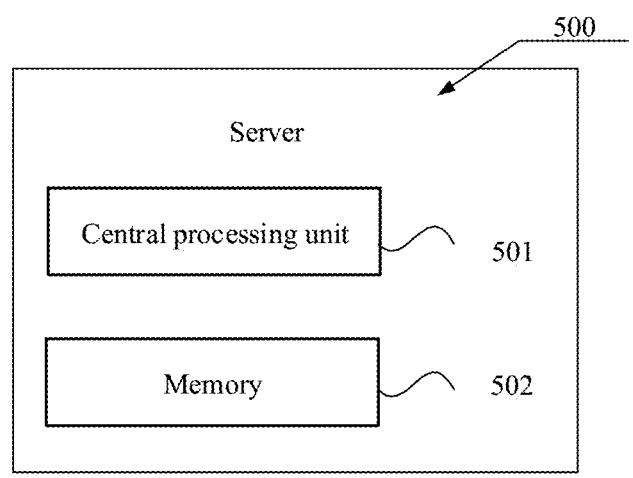
FIG. 5 is a block diagram of a server according to an exemplary embodiment.

FIG. 5 is a block diagram of a server according to an exemplary embodiment. The server 500 may vary greatly due to different configurations or performance and may include at least one central processing unit (CPU) 501 and one or more memories 502. The at least one memory 502 includes at least one program code stored therein. The at least one program code, when loaded and executed by the at least one CPU 501, causes the at least one CPU 501 to execute instructions for: receiving a live streaming access request from a target account, the live streaming access request being initiated for accessing a live streaming room; determining an audience number type of an anchor account in the live streaming room, the audience number type indicating a number of online audiences in the live streaming room; determining a target media server matching the audience number type; and transmitting, based on the target media server, a live video stream in the live streaming room to a terminal from which the target account is logged in. The server 500 may also have components such as a wired or wireless network interface, a keyboard, and an input/output interface, for input and output. The server 500 may further include other components for implementing the functions of the device, which will not be described herein.

In some embodiments, the at least one program code, when loaded and executed by the at least one CPU 501, causes the at least one CPU 501 to execute instructions for: determining, in response to the anchor account belonging to either a first account list or a second account list, the audience number type of the anchor account as an audience number type corresponding to the list to which the anchor account belongs, wherein the first account list stores a plurality of accounts corresponding to a first audience number type, and the first audience number type indicates that the number of online audiences in the live streaming room is greater than a first threshold; the second account list stores a plurality of accounts corresponding to a second audience number type, and the second audience number type indicates that the number of online audiences in the live streaming room is greater than a second threshold and is less than or equal to the first threshold.

In some embodiments, the at least one program code, when loaded and executed by the at least one CPU 501, causes the at least one CPU 501 to execute an instruction for: determining the audience number type of the anchor account as a third audience number type in response to the anchor account belonging to neither the first account list nor the second account list, the third audience number type indicating that the number of online audiences in the live streaming room is less than or equal to the second threshold.

In some embodiments, the at least one program code, when loaded and executed by the at least one CPU 501, causes the at least one CPU 501 to execute an instruction for: selecting one media server from a plurality of media servers as the target media server in response to the audience number type of the anchor account being the first audience number type.

In some embodiments, the at least one program code, when loaded and executed by the at least one CPU 501, causes the at least one CPU 501 to execute an instruction for: randomly selecting one media server from the plurality of media servers as the target media server in response to the audience number type of the anchor account being the first audience number type.

In some embodiments, the at least one program code, when loaded and executed by the at least one CPU 501, causes the at least one CPU 501 to execute instructions for: selecting a target number of media servers from a plurality of media servers based on the anchor account and a total number of the plurality of media servers and selecting one media server from the target number of media servers as the target media server, in response to the audience number type of the anchor account being the second audience number type.

In some embodiments, the at least one program code, when loaded and executed by the at least one CPU 501, causes the at least one CPU 501 to execute instructions for: acquiring last target digits of the anchor account in response to the audience number type of the anchor account being the second audience number type; acquiring a remainder corresponding to the anchor account by dividing the last target digits of the anchor account by the total number of the plurality of media servers; selecting, from the plurality of media servers, a media server with a serial number being the remainder; acquiring the target number of media servers by using the serial number of the media server as a starting serial number; and selecting one media server from the target number of media servers as the target media server.

In some embodiments, the at least one program code, when loaded and executed by the at least one CPU 501, causes the at least one CPU 501 to execute an instruction for: selecting, in response to the audience number type of the anchor account being the third audience number type, one media server from a plurality of media servers as the target media server based on the anchor account and a total number of the plurality of media servers.

In some embodiments, the at least one program code, when loaded and executed by the at least one CPU 501, causes the at least one CPU 501 to execute instructions for: acquiring last target digits of the anchor account in response to the audience number type of the anchor account being the third audience number type; acquiring a remainder corresponding to the anchor account by dividing the last target digits of the anchor account by the total number of the plurality of media servers; and selecting, from the plurality of media servers, a media server with a serial number being the remainder as the target media server.

In some embodiments, the at least one program code, when loaded and executed by the at least one CPU 501, causes the at least one CPU 501 to execute instructions for: detecting numbers of online audiences of a plurality of live streaming rooms at target intervals; and updating a corresponding list in the first account list and the second account list based on the numbers of online audiences of the plurality of live streaming rooms.

In some embodiments, the at least one program code, when loaded and executed by the at least one CPU 501, causes the at least one CPU 501 to execute instructions for: adding, in response to a number of online audiences of any live streaming room in the plurality of live streaming rooms being greater than the first threshold, an anchor account in the live streaming room to the first account list; and adding, in response to a number of online audiences of any live streaming room in the plurality of live streaming rooms being greater than the second threshold and less than or equal to the first threshold, an anchor account in the live streaming room to the second account list.

In an exemplary embodiment, a storage medium storing a computer program including at least one instruction therein is further provided, such as a memory 502 including a computer program. The computer program, when loaded and run by the CPU 501, causes the CPU 501 to execute instructions for: receiving a live streaming access request from a target account, the live streaming access request being initiated for accessing a live streaming room; determining an audience number type of an anchor account in the live streaming room, the audience number type indicating a number of online audiences in the live streaming room; determining a target media server matching the audience number type; and transmitting, based on the target media server, a live video stream in the live streaming room to a terminal from which the target account is logged in. In some other embodiments, the storage medium may be a non-transitory computer readable storage medium, for example, the non-transitory computer readable storage medium may be a read-only memory (ROM), a random-access memory (RAM), a compact disc read-only memory (CD-ROM), a magnetic tape, a floppy disk, an optical data storage device, or the like.

In some embodiments, the computer program, when loaded and run by the CPU 501, causes the CPU 501 to execute an instruction for: determining, in response to the anchor account belonging to either a first account list or a second account list, the audience number type of the anchor account as an audience number type corresponding to the list to which the anchor account belongs, wherein the first account list stores a plurality of accounts corresponding to a first audience number type, and the first audience number type indicates that the number of online audiences in the live streaming room is greater than a first threshold; the second account list stores a plurality of accounts corresponding to a second audience number type, and the second audience number type indicates that the number of online audiences in the live streaming room is greater than a second threshold and is less than or equal to the first threshold.

In some embodiments, the computer program, when loaded and run by the CPU 501, causes the CPU 501 to execute an instruction for: determining the audience number type of the anchor account as a third audience number type in response to the anchor account belonging to neither the first account list nor the second account list, the third audience number type indicating that the number of online audiences in the live streaming room is less than or equal to the second threshold.

In some embodiments, the computer program, when loaded and run by the CPU 501, causes the CPU 501 to execute an instruction for: selecting one media server from a plurality of media servers as the target media server in response to the audience number type of the anchor account being the first audience number type.

In some embodiments, the computer program, when loaded and run by the CPU 501, causes the CPU 501 to execute an instruction for: randomly selecting one media server from the plurality of media servers as the target media server in response to the audience number type of the anchor account being the first audience number type.

In some embodiments, the computer program, when loaded and run by the CPU 501, causes the CPU 501 to execute instructions for: selecting a target number of media servers from a plurality of media servers based on the anchor account and a total number of the plurality of media servers and selecting one media server from the target number of media servers as the target media server, in response to the audience number type of the anchor account being the second audience number type.

In some embodiments, the computer program, when loaded and run by the CPU 501, causes the CPU 501 to execute the instructions for: acquiring last target digits of the anchor account in response to the audience number type of the anchor account being the second audience number type; acquiring a remainder corresponding to the anchor account by dividing the last target digits of the anchor account by the total number of the plurality of media servers; selecting, from the plurality of media servers, a media server with a serial number being the remainder; acquiring the target number of media servers by using the serial number of the media server as a starting serial number; and selecting one media server from the target number of media servers as the target media server.

In some embodiments, the computer program, when loaded and run by the CPU 501, causes the CPU 501 to execute an instruction for: selecting, in response to the audience number type of the anchor account being the third audience number type, one media server from a plurality of media servers as the target media server based on the anchor account and a total number of the plurality of media servers.

In some embodiments, the computer program, when loaded and run by the CPU 501, causes the CPU 501 to execute instructions for: acquiring last target digits of the anchor account in response to the audience number type of the anchor account being the third audience number type; acquiring a remainder corresponding to the anchor account by dividing the last target digits of the anchor account by the total number of the plurality of media servers; and selecting, from the plurality of media servers, a media server with a serial number being the remainder as the target media server.

In some embodiments, the computer program, when loaded and run by the CPU 501, causes the CPU 501 to execute instructions for: detecting numbers of online audiences of a plurality of live streaming rooms at target intervals; and updating a corresponding list in the first account list and the second account list based on the numbers of online audiences of the plurality of live streaming rooms.

In some embodiments, the computer program, when loaded and run by the CPU 501, causes the CPU 501 to execute instructions for: adding, in response to a number of online audiences of any live streaming room in the plurality of live streaming rooms being greater than the first threshold, an anchor account in the live streaming room to the first account list; and adding, in response to a number of online audiences of any live streaming room in the plurality of live streaming rooms being greater than the second threshold and less than or equal to the first threshold, an anchor account in the live streaming room to the second account list.

An embodiment of the present disclosure further provides a computer program product. The computer program product includes at least one computer instruction. The at least one computer instruction is stored in a computer-readable storage medium accessible by an electronic device. The at least one computer program, when loaded and executed by a processor of a server, causes the server to perform the method for determining a media server described in the foregoing embodiments.

A person skilled in the art may easily envisage other solutions of the present disclosure in consideration of the specification and practicing the disclosure herein. The present disclosure is intended to cover any variations, purposes or applicable changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and spirit of the present disclosure are pointed out by the appended claims.

It should be noted that, the present disclosure is not limited to the precise structures that have been described above and shown in the accompanying drawings, and may be modified and changed without departing from the scope of the present disclosure. The scope of the present disclosure is defined by the appended claims.

What is claimed is:

1. A method for determining a media server, comprising:
   receiving a live streaming access request from a target account, the live streaming access request being initiated for accessing a live streaming room;
   determining an audience number type of an anchor account in the live streaming room, the audience number type indicating a number of online audiences in the live streaming room;
   determining a target media server matching the audience number type; and
   transmitting, based on the target media server, a live video stream in the live streaming room to a terminal from which the target account is logged in.

2. The method according to claim 1, wherein said determining the audience number type of the anchor account in the live streaming room comprises:
   determining, in response to the anchor account belonging to either a first account list or a second account list, the audience number type of the anchor account as an audience number type corresponding to the list to which the anchor account belongs,
   wherein the first account list stores a plurality of accounts corresponding to a first audience number type, and the first audience number type indicates that the number of online audiences in the live streaming room is greater than a first threshold; and the second account list stores a plurality of accounts corresponding to a second audience number type, and the second audience number type indicates that the number of online audiences in the live streaming room is greater than a second threshold and is less than or equal to the first threshold.

3. The method according to claim 2, wherein said determining the audience number type of the anchor account in the live streaming room comprises:
   determining the audience number type of the anchor account as a third audience number type in response to the anchor account belonging to neither the first account list nor the second account list, the third audience number type indicating that the number of online audiences in the live streaming room is less than or equal to the second threshold.

4. The method according to claim 2, wherein said determining the target media server matching the audience number type comprises:

selecting one media server from a plurality of media servers as the target media server in response to the audience number type of the anchor account being the first audience number type.

5. The method according to claim 4, wherein said selecting one media server from the plurality of media servers as the target media server comprises:
randomly selecting one media server from the plurality of media servers as the target media server in response to the audience number type of the anchor account being the first audience number type.

6. The method according to claim 2, wherein said determining the target media server matching the audience number type comprises:
selecting a target number of media servers from a plurality of media servers based on the anchor account and a total number of the plurality of media servers and selecting one media server from the target number of media servers as the target media server, in response to the audience number type of the anchor account being the second audience number type.

7. The method according to claim 6, wherein said selecting the target number of media servers from the plurality of media servers and selecting one media server from the target number of media servers as the target media server comprise:
acquiring last target digits of the anchor account in response to the audience number type of the anchor account being the second audience number type;
acquiring a remainder corresponding to the anchor account by dividing the last target digits of the anchor account by the total number of the plurality of media servers;
selecting, from the plurality of media servers, a media server with a serial number being the remainder;
acquiring the target number of media servers by using the serial number of the media server as a starting serial number; and
selecting one media server from the target number of media servers as the target media server.

8. The method according to claim 3, wherein said determining the target media server matching the audience number type comprises:
selecting, in response to the audience number type of the anchor account being the third audience number type, one media server from a plurality of media servers as the target media server based on the anchor account and a total number of the plurality of media servers.

9. The method according to claim 8, wherein said selecting one media server from the plurality of media servers as the target media server comprises:
acquiring last target digits of the anchor account in response to the audience number type of the anchor account being the third audience number type;
acquiring a remainder corresponding to the anchor account by dividing the last target digits of the anchor account by the total number of the plurality of media servers; and
selecting, from the plurality of media servers, a media server with a serial number being the remainder as the target media server.

10. The method according to claim 2, wherein in response to receiving the live streaming access request from the target account, the method further comprises:
detecting numbers of online audiences of a plurality of live streaming rooms at target intervals; and
updating a corresponding list in the first account list and the second account list based on the numbers of online audiences of the plurality of live streaming rooms.

11. The method according to claim 10, wherein said updating the corresponding list in the first account list and the second account list comprises:
adding, in response to a number of online audiences of any live streaming room in the plurality of live streaming rooms being greater than the first threshold, an anchor account in the live streaming room to the first account list; and
adding, in response to a number of online audiences of any live streaming room in the plurality of live streaming rooms being greater than the second threshold and less than or equal to the first threshold, an anchor account in the live streaming room to the second account list.

12. A server, comprising:
a processor; and
a memory configured to store at least one instruction executable by the processor;
wherein the processor, when loading and executing the at least one instruction, is caused to perform a method comprising:
receiving a live streaming access request from a target account, the live streaming access request being initiated for accessing a live streaming room;
determining an audience number type of an anchor account in the live streaming room, the audience number type indicating a number of online audiences in the live streaming room;
determining a target media server matching the audience number type; and
transmitting, based on the target media server, a live video stream in the live streaming room to a terminal from which the target account is logged in.

13. The server according to claim 12, wherein said determining the audience number type of the anchor account in the live streaming room comprises:
determining, in response to the anchor account belonging to either a first account list or a second account list, the audience number type of the anchor account as an audience number type corresponding to the list to which the anchor account belongs,
wherein the first account list stores a plurality of accounts corresponding to a first audience number type, and the first audience number type indicates that the number of online audiences in the live streaming room is greater than a first threshold; the second account list stores a plurality of accounts corresponding to a second audience number type, and the second audience number type indicates that the number of online audiences in the live streaming room is greater than a second threshold and is less than or equal to the first threshold.

14. The server according to claim 13, wherein said determining the audience number type of the anchor account in the live streaming room comprises:
determining the audience number type of the anchor account as a third audience number type in response to the anchor account belonging to neither the first account list nor the second account list, the third audience number type indicating that the number of online audiences in the live streaming room is less than or equal to the second threshold.

15. The server according to claim 13, wherein said determining the target media server matching the audience number type comprises:

selecting one media server from a plurality of media servers as the target media server in response to the audience number type of the anchor account being the first audience number type.

16. The server according to claim 15, wherein said selecting one media server from the plurality of media servers as the target media server comprises:

randomly selecting one media server from the plurality of media servers as the target media server in response to the audience number type of the anchor account being the first audience number type.

17. The server according to claim 13, wherein said determining the target media server matching the audience number type comprises:

selecting a target number of media servers from a plurality of media servers based on the anchor account and a total number of the plurality of media servers and selecting one media server from the target number of media servers as the target media server, in response to the audience number type of the anchor account being the second audience number type.

18. The server according to claim 17, wherein said selecting the target number of media servers from the plurality of media servers and selecting one media server from the target number of media servers as the target media server comprise:

acquiring last target digits of the anchor account in response to the audience number type of the anchor account being the second audience number type;

acquiring a remainder corresponding to the anchor account by dividing the last target digits of the anchor account by the total number of the plurality of media servers;

selecting, from the plurality of media servers, a media server with a serial number being the remainder;

acquiring the target number of media servers by using the serial number of the media server as a starting serial number; and selecting one media server from the target number of media servers as the target media server.

19. The server according to claim 14, wherein said determining the target media server matching the audience number type comprises:

selecting, in response to the audience number type of the anchor account being the third audience number type, one media server from a plurality of media servers as the target media server based on the anchor account and a total number of the plurality of media servers.

20. A non-transitory storage medium storing at least one instruction therein, wherein at least one instruction, when loaded and executed by a processor of a server, causes the server to perform a method comprising:

receiving a live streaming access request from a target account, the live streaming access request being initiated for accessing a live streaming room;

determining an audience number type of an anchor account in the live streaming room, the audience number type indicating a number of online audiences in the live streaming room;

determining a target media server matching the audience number type; and transmitting, based on the target media server, a live video stream in the live streaming room to a terminal from which the target account is logged in.

* * * * *